Patented May 30, 1950

2,509,777

UNITED STATES PATENT OFFICE 2,509,777

COMPOSITION OF ASPHALT AND A BUTADIENE-ACRYLONITRILE COPOLYMER

Frank M. McMillan, Berkeley, and Harry J. Sommer, La Fayette, Calif., assignors to Shell Development Company, San Francisco, Calif., a corporation of Delaware No Drawing. Application January 26, 1946, Serial No. 643,833

11 Claims. (Cl. 260—28.5)

This invention relates to compositions comprising bituminous materials, such as asphalts, and polymers obtained by the copolymerization of unsaturated nitriles with polyolefinic hydrocarbons. In a more limited sense, the invention is concerned with compositions comprising mixtures of asphaltic materials and copolymers of olefinic-bond-containing nitriles and conjugated aliphatic polyolefins, more particularly conjugated diolefins, such as butadiene-1,3 and methylpentadienes. More specifically stated, the invention covers asphaltic materials which contain intimately incorporated therein one or more copolymers of alpha-unsaturated nitriles and conjugated diolefins, preferably copolymers of butadiene-1,3 and acrylonitrile. The compositions of asphalt and butadiene-acrylonitrile copolymer are of the type wherein the latter copolymer has a Mooney plasticity preferably in the range of 75 to 150 at 100° C. A maximum range 30 to 200 or higher Mooney plasticity at 100° C. for the butadiene-acrylonitrile copolymer can be employed as useful in said asphaltic compositions.

This invention also relates to the above compositions employed as protective sealing coats, for example on asphaltic surfaces such as asphaltic roadways, paths, floors, airport and aerodrome runways, and the like.

It is well known that various asphaltic compositions not containing copolymers of olefinic-bond-containing nitriles and conjugated aliphatic polyolefins have relatively good roadway surfacing properties when employed in combination with solids such as rocks, stones, sand and cement, and that roadways made from such heretofore-known and used asphaltic compositions have been fairly satisfactory in most respects except in cases where an asphaltic surface was subject to contact with hydrocarbon fractions. When used on airport runways, in automobile garages, or on any surface where spillage of oil occurs, all of the known asphaltic compositions have been reported to suffer from the serious defect of softening and dispersing readily in the spilled hydrocarbon fuels or lubricating oils. This situation has resulted in relatively rapid deterioration and disruption of the asphaltic surface to the extent that it usually became unfit for use in a short time.

The recent development of jet-propelled airplanes and of fuels therefor has again focused the attention of engineers on the disintegration of asphaltic paved surfaces. In starting jet-propelled planes, a sufficient amount of fuel is discharged onto an asphaltic pavement to cause it to soften and disperse in the fuel oil and allow the subsequent blast from the plane to disintegrate the asphaltic surface. Such disintegration of asphaltic surfaces by petroleum oils or synthetic liquid hydrocarbons has prevented the consideration of asphaltic pavements for plane-warming-up aprons, for hard standing areas, for hangar floors, and the like. Similarly, there have been objections to use of asphaltic pavements for garage floors, service station paving, automobile roads, and the like.

Although it has been previously suggested to incorporate natural rubber (or derivatives thereof) into asphalts, and although such asphalts containing the natural rubber usually have higher melting points than the corresponding asphalt free from such natural rubber, these natural rubber-containing asphaltic compositions possess certain defects. Thus, such compositions normally deteriorate rapidly when subjected to the action of hydrocarbon fractions, and will usually crack and peel off under the influence of climatic changes. Additionally, none of the asphaltic compositions containing natural rubber (the usual content of which is below 20% by weight and preferably not more than about 5%) have solved the problem of providing an adherent and lasting sealing coating for asphaltic surfaces, which compositions were at the same time compatible and would not disintegrate when subjected to the action of hydrocarbon oils, e. g. hydrocarbon fractions which may spill or leak from various machinery, etc., disposed or located on such coated asphaltic surfaces.

It is an object of the present invention to provide novel asphaltic compositions which obviate the above and other defects, and which have unique characteristics which render them particularly suitable as coatings of asphaltic surfaces. It is another object of the present invention to provide a seal coat for asphaltic surfaces which coating will adhere firmly to the foundation surface, and in which the components of the seal coat are not only compatible with each other, but are also compatible with the asphaltic surface itself, said seal coating being of such character that it presents an exposed surface which will not be dispersed and will not deteriorate to any substantial degree under the influence of hydrocarbon oil spillage. Still another object is to provide a seal coat of the character described which does not crack and peel under the influence of air, sunlight, and general weather conditions. A further object is to provide a seal coat having a sufficiently high softening point capable of resisting softening when subjected to direct sunlight temperatures of up to 160° F. A still further object is to provide a seal coat which is stable to cold winter temperatures.

It has now been discovered that the above and other objects may be attained by asphaltic compositions containing or comprising an asphalt or like bitumen, and one or more copolymers of a polyolefinic, preferably conjugated polyolefinic hydrocarbon and an unsubstituted or substituted unsaturated nitrile, preferably an alpha,beta-unsaturated nitrile.

The term "asphalt," as used herein and in the appended claims, includes bituminous materials containing asphaltenes or tarry constituents and comprises such bituminous materials in, for example: petroleum residues, pitches, road oils, albino asphalts; asphalt cutbacks, solutions or dispersions; cracked, straight-run or natural asphalts. In making preferred aqueous dispersions comprising one phase of this invention, an asphalt having a penetration at 77° F. in the range of 40 to 50 may be employed, although in some cases asphalts having a penetration at 77° F. ranging from 50 to 150 have also been employed effectively.

Although any unsaturated nitrile may be employed in the preparation of the mentioned copolymers as applied in this invention, the preferred class of such nitriles comprises the alpha, beta-unsaturated nitriles having the general structural formula:

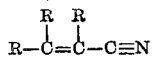

wherein each R may be the hydrogen atom or an alkyl, aryl, aralkyl, alkenyl, aralkenyl, alicyclic or heterocyclic radical, which may contain or be substituted by substituent groups or elements. Among the many alpha,beta-unsaturated nitriles may be mentioned: acrylonitrile, methacrylonitrile, crotonitrile, alpha-ethyl acrylonitrile, alpha-propyl acrylonitrile, alpha,beta-dimethyl acrylonitrile, beta-ethyl acrylonitrile, alpha-phenyl acrylonitrile, alpha-naphthyl acrylonitrile, etc. Also, halo-substituted derivatives, e. g. alpha-chloro-acrylonitrile, alpha-bromo-acrylonitrile, alpha, beta-dichloro-acrylonitrile may be used for the preparation of the mentioned copolymers. The lower homologs of said nitriles, e. g. acrylonitrile and methacrylonitrile, as well as their halo-substituted derivatives, are generally preferred.

Similarly, although any polyolefin may be copolymerized with any one or more of the above class of unsaturated nitriles, it is usually preferable or at least desirable to employ conjugated polyolefins, of which the following are illustrative examples: butadiene-1,3, pentadiene-1,3, 1-methyl-butadiene-1,3, 2-methyl-butadiene-1,3, 2,4-dimethyl-butadiene-1,3, 2,3-dimethyl-butadiene-1,3, 1,2-dimethyl-butadiene-1,3, 1,4-dimethyl-butadiene-1,3, 2,3-dipropyl-butadiene-1,3, 2-methyl-4-propyl-butadiene-1,3, 1-phenyl-butadiene-1,3, 3-phenyl-butadiene-1,3, 2-chloro-butadiene-1,3, hexatriene-1,3,5, 2,4-dimethyl-hexatriene-1,3,5, 1-phenyl-hexatriene-1,3,5, and the like, and their homologs and analogs, as well as suitable substituted derivatives, e. g. halo-substituted diolefins such as 2-chloro-butadiene-1,3.

The desired copolymers may also be produced by copolymerizing an unsaturated, particularly alpha-unsaturated nitrile with two or more different conjugated diolefins. An example of such a tripolymer is one formed by copolymerizing 3 - methyl - pentadiene-1,3, butadiene - 1,3 and methacrylonitrile. Also, it is possible to produce a tripolymer, for example, by copolymerizing a conjugated diene with two different unsaturated nitriles, e. g. acrylonitrile, methacrylonitrile and/or 2-chloro-butadiene-1,3. In fact, as indicated, it is possible to use any one or more of the mentioned and like unsaturated nitriles and any one or more of the various polyolefins, provided the resultant copolymer has at least a nitrile content approximately that present in a copolymer formed by polymerizing a mixture containing 20% by weight of acrylonitrile and the rest butadiene.

Generally speaking, the specified copolymers may be produced by reacting (copolymerizing) a polyolefin, such as butadiene-1,3, with between about 20% and about 45%, by weight, of the unsaturated nitrile. Such compositions, when in the form of aqueous dispersions of butadiene-acrylonitrile copolymers, are known as Buna N latex. Nitrogen analyses of the Buna N recovered from some of these latexes have been found to show nitrogen contents in the range of 7.0% to 10.6% or even higher.

A Buna N elastomer present in Buna N latex, and which can be recovered from the latter, is well characterized in its elastomeric properties by its Mooney plasticity. A Buna N elastomer, which may be employed as an aqueous dispersion (latex) in the preparation of the compositions of the present invention, preferably has a Mooney plasticity in the range of 75 to 150 at 100° C. However, Buna N copolymers of 40 to 200 Mooney plasticity at 100° C. may also be employed. The method of determining Mooney plasticity is described in "Industrial and Engineering Chemistry," vol. 2, page 147, 1934 edition; by Weaver in "Rubber Age," vol. 48, page 89, 1940 edition; and by Vanderbilt in "Rubber Handbook," page 254, 1942 edition, it being noted that the values of plasticity set forth above refer to the use of the larger of the two rotors.

As indicated, it was discovered that aqueous dispersions containing both an asphalt and one or more of the aforesaid copolymers (e.g., a butadiene-acrylonitrile copolymer) are particularly effective compositions for obtaining the desired objects set forth above. This is of particular utility because such dispersions may be simply painted, sprayed, or otherwise distributed over an asphaltic surface. Due to the ease of preparation, handling and/or application of the present compositions, which do not necessitate vulcanization, application of heat, or special machinery, substantial savings in time and costs are effected.

As a preferred embodiment of the invention, an aqueous dispersion of butadiene-acrylonitrile copolymer (or of one of the similar copolymers indicated above) is introduced into an aqueous dispersion of asphalt (or vice versa) so as to obtain a ratio of the copolymer to asphalt of approximately 1 to 3. The resultant dispersion of copolymer and asphalt is simply painted or sprayed onto an asphaltic surface so as to obtain a normal painted thickness of coating. However, if desired, the painting or other application may be repeated as often as desired to build up several consecutive coats of the asphaltic composition containing the copolymer. The building up of consecutive coats containing such a copolymer can be desirably modified by applying increasingly higher concentrations of the copolymer in the consecutive coats of asphaltic composition until the final coat exposed to traffic consists substantially of the copolymer.

In the case of aqueous dispersions of asphalt formed in the presence of soaps, it is preferable to have stabilizers such as caseinates or alginates present in the dispersion, and to incorporate a small amount of a soluble alkaline hydroxide of an alkali metal or an alkaline earth metal, preferably sodium hydroxide. Ammonium hydroxide may also be used in some cases. Clay-containing dispersions of asphalt in which the clay is capable of ion exchange are also useful in preparing the present compositions with the specified copolymers.

Methods of emulsification are conventional. Asphalt can be heated above its melting point and an aqueous soap solution is separately heated and the two components are then combined in a colloid mill or other suitable emulsifying mill. A soap-forming acid may be added to the asphalt and the asphalt then emulsified with an aqueous solution of sodium or potassium hydroxide. A preferred method of mixing comprises dividing the water required for emulsification into two portions, emulsifying the asphalt first with only one portion so as to produce a concentrated emulsion containing about 20% to 30% water and then diluting this emulsion with the remainder of the water to the desired asphalt content, which normally ranges between about 25% and about 65%. By using split emulsification, a finer emulsion can be obtained than by a one-step method, a fine emulsion normally being an essential to allow a more thoroughly intimate and homogeneous dispersion of the emulsified asphalt particles through and together with the later-added emulsion of butadiene-acrylonitrile copolymer.

The content of the specified copolymers in the asphaltic compositions of the present invention may vary within relatively wide limits, depending in part on the specific copolymer used, the purposes for which such compositions are employed, etc. For instance, when the asphaltic compositions of the present invention contain a copolymer which has an equivalent of approximately 30% by weight of acrylonitrile, satisfactory results have been attained by using compositions containing between about 17% and about 30% by weight of the copolymer, as calculated on a dry basis. In such cases, the preferred copolymer content is equal to about 25% by weight, which is equal to about 7.5% of acrylonitrile in the asphaltic composition (when considered on a dry basis). When the above-mentioned butadiene-acrylonitrile copolymer (produced by using 30% acrylonitrile) was tried alone as a seal coat for a substantially solid or plastic asphalt, such a copolymer did not adhere to the asphalt, peeled and curled off, had poor resistance to sunlight, and did not substantially protect the underlying asphalt from deterioration by hydrocarbon liquids. When such copolymer constituted less than about 17% by weight of an anphaltic seal coat (on a dry basis), the seal coat possessed substantially the same aforementioned defects when subjected to relatively severe usage. On the other hand, when the aforementioned copolymer constituted between about 17% and about 30% by weight of an asphaltic seal coat (on a dry basis), and preferably when the asphaltic composition of this invention contained approximately 25% of this butadiene-acrylonitrile copolymer, then the resultant composition, when applied to an asphalt surface, protected and adhered firmly to the latter, did not peel or curl off, was itself resistant to action of hydrocarbon liquids or their vapors, substantially protected the underlying asphalt from deterioration by hydrocarbons, and permitted severe usage of such surfaces as herein described. When such a copolymer (containing copolymerized within itself 30% by weight of acrylonitrile) constituted more than about 30% by weight of an asphaltic seal coat on a dry basis, then the bonding strength of the latter to a primary asphalt may not be considered as strong as usually desirable. However, a seal coating composition of the latter type, for example one containing about 50% of the 30% acrylonitrile-70% butadiene copolymer, could be advantageously applied to a prior seal coat or surface containing approximately 25% of such a type of acrylonitrile copolymer.

Relevant to seal coating compositions containing approximately 40% by weight of acrylonitrile in the butadiene-acrylonitrile copolymer incorporated into asphalt, the following facts were found by experimentation wherein the given percentages are weight percentages based on weight of a dry seal coat or film: When seal coats containing as little as 5% of such a copolymer were tried upon a conventional old asphalt pavement, the protective coating obtained was satisfactory in its bonding or adhesion, in its resistance to sunlight, and in its resistance to flooding with kerosene for 2 hours. Asphaltic compositions containing from 5% to about 30% of such a copolymer (in increments of 5%) were each found to give excellent bonding when applied to a conventonal old asphalt pavement and afforded satisfactory protection against flooding or soaking with kerosene.

The described aqueous dispersions of butadiene-acrylonitrile copolymer (or of other polyolefin-unsaturated nitrile copolymers) and asphalt have the following advantages when used as a coating on asphaltic surfaces. These aqueous dispersions are stable over periods of six months or more. The present novel compositions do not require the presence of other additives, for example plasticizers, accelerators, fillers, antioxidants, waxes, vulcanization-promoting agents, vulcanization ingredients, cation-active materials, etc. In some cases minor amounts, for example less than 2%, of an antioxidant, such as phenyl-beta-naphthylamine, may be incorporated without any detrimental results. No necessity exists for incorporating either an unsaturated nitrile-polyolefin copolymer or asphalt into each other by a solution in a solvent, because it has been discovered that it is preferable to have water as the continuous phase in the colloidal and emulsified system. There is no criticality in the mode in which an emulsion, for example of a Buna N copolymer, is mixed with an emulsion of the asphalt. The Buna N-asphalt emulsion is a water-bound paint, and in itself has very good adhesion properties. No curing problem exists; as soon as water has dissipated sufficiently from the emulsion applied to a surface and the residual adherent coat has come to equilibrium, the surface thus coated is ready for use.

Although, as indicated, no substances need be added to the compositions of the present invention, it is obvious that various materials may be added to an asphaltic composition containing polyolefin-unsaturated nitrile copolymers without departing from the scope and spirit of the invention described herein. For example, plasticizers, accelerators, fillers, antioxidants, waxes, vulcanization-promoting agents, vulcanization ingredients, cation-active materials, and various resins or dispersions of resins can be incorporated with or added to the present compositions. It was found, for example, that incorporation of a conventional curing agent with 25% by weight of a Buna N copolymer and 75% by weight of asphalt on a dry basis gave beneficial results in the formation of a cohesive film.

The described compositions comprising the specified copolymers and asphalt, either as such or in combination with other partially efficacious or practically inert substances, may be applied to various asphaltic surfaces such as airport runways, plane-warming-up aprons, garage floors, service station pavings, automobile roadways and the like. The described compositions of this invention can be employed in the form of more or less concentrated dispersions in liquid vehicles or media other than those particularly disclosed herein. The present compositions may be utilized alone or in combination with other known coating compositions, for example roadway-coating compositions which contain natural rubber, or derivatives thereof, and coating compositions containing polymers of diolefinic hydrocarbons such as polymers of butadiene with itself or polymers of butadiene with isoprene.

The present compositions, as deposited from either aqueous dispersions or from dispersions or solutions containing little or no water, are useful as coatings or impregnants of cloth, paper, various absorbent materials, and like surfaces.

The novel compositions of the present invention are also applicable in the form of their solutions, partial solutions, or dispersions in various liquid or solid vehicles, particularly of the type of ketones (which may be aliphatic or aromatic ketones), aromatic hydrocarbons (which may be admixed with a considerable amount of aliphatic hydrocarbons), and brominated or chlorinated aliphatic hydrocarbons.

The present compositions, preferably those comprising a butadiene-acrylonitrile copolymer and asphalt, may also be mixed with or partially absorbed by such solid materials as sand, clay, bentonite, sulfur, carbon black, discrete particles of crepe rubber, freshly compounded rubber, aged compounded rubber, and used waste compounded articles of rubber manufacture. In the case of incorporating sand into an aqueous dispersion of butadiene-acrylonitrile copolymer with asphalt, it is not necessary to prewet the sand with a dilute caseinate to enable ready mixing. In a preferred practice, for example, the aqueous dispersions of the copolymer and asphalt were thoroughly mixed, then between 0.5% and 1% by weight of casein based on the weight of asphalt present, was added as a 10% by weight dispersion of casein in water containing approximately 0.6% by weight of sodium hydroxide, and the sand was then added. In this way ready mixing was obtained, followed by satisfactory results in application of such a mixture as a coating of an unsealed asphaltic concrete. On the other hand, it was not necessary to add any casein when an aqueous dispersion of copolymer and asphalt had zero demulsibility to 0.1 N calcium chloride, as defined by the American Society for Testing Materials specification D244-42, pages 16, 17 and 18; and such a dispersion mixed well with sand, showed good stability, and gave good results in seal coating an asphaltic concrete.

Other variations of the invention herein presented will be apparent to those skilled in the art, such as melting the specified copolymers together with asphalt and dispersing the resultant fluidized mass onto asphaltic surfaces; painting a vulcanizing oil-soluble agent onto an asphaltic surface and then applying a specified copolymers-in-asphalt composition; applying a thermosetting resin onto an asphaltic surface and then applying one or more of the specified copolymer-asphalt compositions.

For purposes of illustration, reference will be had to the following specific examples, it being understood that there is no intention of being limited to the specific conditions disclosed. The percentages specified in the following examples are percentages by weight unless otherwise specified.

*Example I*

An aqueous latex of Buna N (comprising a copolymer formed by the copolymerization of approximately 30% acrylonitrile with 70% butadiene) in the form of a creamed concentrate containing about 52% solids was mixed while stirring into an aqueous emulsion of asphalt containing 60% asphalt, the mixing being in the ratio of 1.16 gallons of the latex to 3 gallons of the said asphalt emulsion, thus giving a ratio of 1 part of Buna N to 3 parts of asphalt by weight. The resultant mixture contained 42.5% by weight of water and was coated onto panels of asphaltic concrete at the rate of 0.2 gallon per square yard. The coatings thus formed were approximately $\frac{1}{32}$ of an inch in thickness and were found to adhere satisfactorily to the asphaltic pavement. These coated panels, after suitable drying, were subjected to spraying with a Diesel fuel oil for two days. Under this treatment the described coated asphaltic pavement panels remained firm, whereas uncoated asphaltic pavement panels were drastically disintegrated. Such a dried coating of asphalt containing Buna N upon an asphalt base also resisted serious softening or disintegrating effects of soaking with kerosene and Diesel fuel for 56 hours. Samples of the described asphaltic Buna N coat also showed good adhesion to asphaltic concrete in that they displayed no tendency to curl or peel under the influence of ultra-violet arc light at 140° F.

*Example II*

A mixture of aqueous Buna N latex with the aqueous emulsion of asphalt described in the above Example I was also tested by applying the mixture to certain areas of asphaltic pavements subjected to relatively heavy traffic of automobiles. These areas were designated area No. 1 and area No. 2. Area No. 1 was 7½ ft. x 6 ft., and was located on a regularly-used driveway. Area No. 2 was 3 ft. x 6 ft. and was located in an adjacent regularly-used parking stall. The above composition was applied by pouring and squeegeeing at the rate of 0.20 gallon per sq. yd. The ambient air temperature was about 58° F. The asphaltic pavement thus treated was a recently-laid asphaltic penetration macadam having a ¼-inch minus sand seal. This type of asphaltic pavement is especially susceptible to deterioration by liquid hydrocarbons. It was found that the above composition was easily applied, that the said rate of application was slightly excessive for smooth portions thereof. The coatings thus obtained were sufficiently dry after 2½ hours so that an automobile was driven over these areas without apparent damage to these seal coats. The latter adhered very tightly to the asphaltic pavement underneath.

Approximately five days after the above-described test and application of the described composition, Diesel fuel was applied to a 1 ft. x 3 ft. portion of area No. 1 by soaking a cloth rag in the fuel and rubbing it over the surface. Also, two open-ended cylinders were placed upright upon other portions of area No. 1 and the lower rims of these cylinders were sealed to the asphaltic Buna N surface by means of putty. Gasoline was poured into one cylinder and Diesel fuel into the other cylinder, up to a liquid height of about 1 inch in each. After permitting these hydrocarbon liquid solvents to thus stand for 1¾ hours, the cylinders and putty were removed, the solvents were soaked up with rags, and the treated areas were studied. It was found that the area subjected to rubbing with Diesel fuel showed no evidence of disintegration, that the seal coat treated with the liquid layer of Diesel fuel was intact and was apparently only slightly softened, that when vigorously rubbed with a rag this seal coat remained intact, and that the seal coat treated with the liquid layer of gasoline remained intact, resisted vigorous rubbing with a rag, and otherwise appeared normal. It was also found that the seal coats on area No. 1 and area No. 2 were very highly adherent to the macadam, and that it was substantially impossible, or at least very difficult, to separate the seal coat from the underlying asphalic surface by means of a pocket-knife.

*Example III*

The asphalt composition containing the copolymer (as described in the previous examples) was applied to a 7½ ft. by 6 ft. area of a heavily traveled roadway which had a surfacing of a dense, smooth asphaltic concrete which was about 2 years old. This roadway surface was swept clean and then the above composition was applied at a rate of 0.2 gal. per sq. yd. In this case it was discovered that the resultant seal coat dried within less than 2 hours, and that after 24 hours under automobile traffic over the area of this seal coat, more than 98% of the seal coat was found to be firmly in place.

*Example IV*

Concentrations of 20% and of 25% by weight of Buna N (as calculated on the basis of a dried film) were made up in an aqueous emulsion of asphalt. This Buna N was the copolymer obtained from approximately 30% acrylonitrile copolymerized with 70% butadiene. These two aqueous mixtures of asphalt with Buna N were sprayed onto 6 inch discs of asphaltic concrete. The resultant films were cured at ambient room temperatures for 36 hours and then were submitted to flooding with a 50–50 mixture of kerosene and a Diesel fuel twice a day for 2 days. The samples were found to have withstood this treatment, there being no noticeable disintegration of the asphaltic mass, or any peeling off of the coating.

*Example V*

An aqueous emulsion containing a mixture of approximately 75% by weight of asphalt and 25% by weight of Perbunan G (a butadiene-acrylonitrile copolymer containing approximately 30% by weight of acrylonitrile) into which was incorporated an amount of a highly aromatic high-molecular-weight unsaturated hydrocarbon oil equivalent to 10% by weight of the Perbunan G, was painted onto an asphalt-aggregate paving slab. The coating was allowed to dry superficially indoors and then was placed outdoors in the sunlight. After thus standing about 2 days, this coated slab was wetted with Diesel fuel oil. No damage to the asphaltic coat was apparent from such treatment.

*Example VI*

An aqueous dispersion of a Buna N copolymer (comprising approximately 40% acrylonitrile copolymerized with 60% butadiene) and containing 28% solids was thoroughly mixed with an aqueous dispersion of asphalt containing 60% solids so as to obtain a number of separate dispersions of different concentrations[1] as follows:

1. 5% of the copolymer, or 18 g. of the copolymer with 158 g. of the asphalt.
2. 10% of the copolymer, or 37 g. of the copolymer with 150 g. of the asphalt.
3. 15% of the copolymer, or 54 g. of the copolymer with 142 g. of the asphalt.
4. 20% of the copolymer, or 57 g. of the copolymer with 107 g. of the asphalt.
5. 25% of the copolymer, or 63 g. of the copolymer in 96 g. of the asphalt.
6. 30% of the copolymer, or 75 g. of the copolymer in 82 g. of the asphalt.

[1] Concentrations are expressed as weight percentages based on dry weight of a film prepared from the respective aqueous dispersions.

Applications of each of the above aqueous dispersions were made to separate outdoor plots of unsealed asphaltic concrete. Each plot was 1 ft. by 2½ ft. in area. The ambient temperature was about 60° F. and the humidity was about 75%. After exposure to the weather for approximately 4 days, the plots were soaked with kerosene and kept continuously wetted with kerosene for about 2 hours. All of the above coatings remained intact and adequately protected the underlying asphalt from the action of the kerosene. Adjacent or nearby areas of the uncoated asphaltic concrete were, however, badly disintegrated by the kerosene.

*Example VII*

To a mixture of aqueous Buna N latex with the aqueous emulsion of asphalt described in Example I (above), there was added an aqueous dispersion of various vulcanizing agents in sufficient amounts to vulcanize the butadiene-acrylonitrile copolymer present in the mixture. The composition of this aqueous dispersion was as follows:

| | Parts by weight |
|---|---|
| Zinc oxide | 1.0 |
| Sulfur | 1.0 |
| Hydroquinone monobenzyl ether | 0.5 |
| Sodium salts of polymerized alkylaryl sulfonic acids | 0.14 |
| Zinc diethyldithiocarbamate | 1.0 |
| Casein | 0.14 |
| Caustic soda | 0.1 |
| Water | 3.12 |
| | 7.00 |

Two parts by weight of this dispersion was added with stirring to 140 parts by weight of the above-mentioned asphalt-Buna N copolymer dispersion. The resultant composition thus formed was spread on a test panel. The coating so obtained, after drying, was found to have satisfactory adhesion and to satisfactorily resist soaking or rubbing with various liquid hydrocarbons, such as gasoline. It was also found that vulcanization of the coating could be effected by heating it for 15 minutes or longer at 100° C., but that substantial vulcanization also occurred over a longer period of time at room temperature.

*Example VIII*

To 142 parts by weight of the prepared mixture described in Example VII there was added 25 parts by weight of an aqueous dispersion of a modified polystyrene resin containing approximately 32% solids. The resultant mixture was spread on a test panel and, after drying, the resultant coating was found to have satisfactory adhesion and resistance to liquid hydrocarbons.

*Example IX*

A mixture similar to that described in Example I was prepared with the exception that, instead of a butadiene-acrylonitrile copolymer, a copolymer of butadiene and methacrylonitrile (formed by the copolymerization of approximately 55 parts by weight of butadiene and 45 parts by weight of methacrylonitrile) was employed in the form of latex containing 30% solids. This mixture was spread on a test panel and, after drying, was found to have satisfactory adhesion and resistance during soaking in or rubbing with gasoline.

We claim as our invention:

1. A composition of matter adherent to asphaltic surfaces and resistant to deleterious softening by petroleum oils and the like comprising as the two major ingredients an asphalt as the sole bituminous ingredient and 5-30% by weight of said asphalt of a rubber, said rubber consisting essentially of a copolymer of an alpha-beta unsaturated nitrile and a conjugated diolefin, in which said copolymer has at least a nitrile group content approximately that present in a copolymer formed by polymerizing a mixture containing 20% by weight of acrylonitrile and the rest butadiene.

2. A composition of matter adherent to asphaltic surfaces and resistant to deleterious softening by petroleum oils and the like, comprising as the two major ingredients an asphalt as the sole bituminous ingredient and 5-30% by weight of said asphalt of a rubber, said rubber consisting essentially of a copolymer of acrylonitrile and butadiene, in which said copolymer has at least a nitrile group content approximately that present in a copolymer formed by polymerizing a mixture containing 20% by weight of acrylonitrile and the rest butadiene.

3. A composition of matter adherent to asphaltic surfaces and resistant to deleterious softening by petroleum oils and the like, comprising as the two major ingredients an asphalt as the sole bituminous ingredient and 5-30% by weight of said asphalt of a rubber, said rubber consisting essentially of a copolymer of methacrylonitrile and butadiene, in which said copolymer has at least a nitrile group content approximately that present in a copolymer formed by polymerizing a mixture containing 20% by weight of acrylonitrile and the rest butadiene.

4. An asphalt-water emulsion, the non-aqueous phase of which comprises as the two major ingredients asphalt as the sole bituminous ingredient and 5-30% by weight of said asphalt of a copolymer of an alpha-beta unsaturated nitrile and a conjugated diolefin, in which said copolymer has at least a nitrile group content approximately that present in a copolymer formed by polymerizing a mixture containing 20% by weight of acrylonitrile and the rest butadiene.

5. An asphalt-water emulsion, the non-aqueous phase of which comprises as the two major ingredients asphalt as the sole bituminous ingredient and 5-30% by weight of said asphalt of a copolymer of acrylonitrile and butadiene, in which said copolymer has at least a nitrile group content approximately that present in a copolymer formed by polymerizing a mixture containing 20% by weight of acrylonitrile and the rest butadiene.

6. An asphalt-water emulsion, the non-aqueous phase of which comprises as the two major ingredients asphalt as the sole bituminous ingredient and 5-30% by weight of said asphalt of a copolymer of methacrylonitrile and butadiene, in which said copolymer has at least a nitrile group content approximately that present in a copolymer formed by polymerizing a mixture containing 20% by weight of acrylonitrile and the rest butadiene.

7. A composition of matter adherent to asphaltic surfaces and resistant to deleterious softening by petroleum oils and the like comprising as the two major ingredients an asphalt as the sole bituminous ingredient and 17-30% by weight of said asphalt of a rubber, said rubber consisting essentially of a copolymer of an alpha-beta unsaturated nitrile and a conjugated diolefin, in which said copolymer has at least a nitrile group content approximately that present in a copolymer formed by polymerizing a mixture containing 20% by weight of acrylonitrile and the rest butadiene.

8. A composition of matter adherent to asphaltic surfaces and resistant to deleterious softening by petroleum oils and the like comprising as the two major ingredients an asphalt as the sole bituminous ingredient and 25% by weight of said asphalt of a rubber, said rubber consisting essentially of a copolymer of an alpha-beta unsaturated nitrile and a conjugated diolefin, in which said copolymer has at least a nitrile group content approximately that present in a copolymer formed by polymerizing a mixture containing 20% by weight of acrylonitrile and the rest butadiene.

9. A composition of matter adherent to asphaltic surfaces and resistant to deleterious softening by petroleum oils and the like comprising as the two major ingredients an asphalt as the sole bituminous ingredient and 5-30% by weight of said asphalt of a rubber, said rubber consisting essentially of a copolymer of an alpha-beta unsaturated nitrile and a conjugated diolefin, in which said copolymer has at least a nitrile group content approximately that present in a copolymer formed by polymerizing a mixture containing 20-45% by weight of acrylonitrile and the rest butadiene.

10. A composition of matter adherent to asphaltic surfaces and resistant to deleterious softening by petroleum oils and the like comprising as the two major ingredients an asphalt having a penetration at 77° F. of 40-150 as the sole bituminous ingredient and 5-30% by weight of said asphalt of a rubber, said rubber consisting essentially of a copolymer of an alpha-beta unsaturated nitrile and a conjugated diolefin, in which said copolymer has at least a nitrile group content approximately that present in a copolymer formed by polymerizing a mixture containing 20% by weight of acrylonitrile and the rest butadiene.

11. A composition of matter adherent to asphalt surfaces and resistant to deleterious softening by petroleum oils and the like, comprising as the two major ingredients an asphalt as the sole bituminous ingredient and 5–30% by weight of said asphalt of a rubber, said rubber consisting essentially of a copolymer of methacrylonitrile and 1-methyl-butadiene-1,3, in which said copolymer has at least a nitrile group content approximately that present in a copolymer formed by polymerizing a mixture containing 20% by weight of acrylonitrile and the rest 1-methyl-butadiene-1,3.

FRANK M. McMILLAN.
HARRY J. SOMMER.

REFERENCES CITED

The following references are of record in the file of this patent:

UNITED STATES PATENTS

| Number | Name | Date |
|---|---|---|
| 1,831,226 | Byrd | Nov. 10, 1931 |
| 2,009,712 | Frolich | July 30, 1935 |
| 2,431,386 | Fischer | Nov. 25, 1947 |

OTHER REFERENCES

Hycar Synthetic Rubber Softener Study, 1941, vol. II, pages 5 and 6. Hydrocarbon Chemical and Rubber Co., Akron, Ohio.